US008700365B2

(12) United States Patent
Junior

(10) Patent No.: US 8,700,365 B2
(45) Date of Patent: Apr. 15, 2014

(54) THERMAL MODELLING OF A TRANSFORMER

(75) Inventor: Roberto Asano Junior, Sao Paulo (BR)

(73) Assignee: ABB Technology Ltd. (CH)

( * ) Notice: Subject to any disclaimer, the term of this patent is extended or adjusted under 35 U.S.C. 154(b) by 0 days.

(21) Appl. No.: 13/435,818

(22) Filed: Mar. 30, 2012

(65) Prior Publication Data

US 2012/0191429 A1 Jul. 26, 2012

Related U.S. Application Data

(63) Continuation of application No. PCT/EP2009/062731, filed on Oct. 1, 2009.

(51) Int. Cl.
*G06F 7/60* (2006.01)
*G06F 17/10* (2006.01)

(52) U.S. Cl.
USPC .......... 703/2

(58) Field of Classification Search
USPC .......... 703/2
See application file for complete search history.

(56) References Cited

U.S. PATENT DOCUMENTS

| | | | | |
|---|---|---|---|---|
| 4,654,806 | A * | 3/1987 | Poyser et al. | 700/292 |
| 5,781,764 | A * | 7/1998 | Degeneff et al. | 703/2 |
| 6,280,659 | B1 * | 8/2001 | Sundin | 252/578 |
| 6,393,895 | B1 * | 5/2002 | Matsiev et al. | 73/24.06 |
| 6,446,027 | B1 * | 9/2002 | O'Keeffe et al. | 702/183 |
| 6,906,630 | B2 * | 6/2005 | Georges et al. | 340/646 |
| 7,030,602 | B2 * | 4/2006 | Khalin et al. | 324/127 |
| 7,222,518 | B2 * | 5/2007 | Dohi et al. | 73/53.01 |
| 2002/0161558 | A1 * | 10/2002 | Georges et al. | 702/189 |
| 2004/0057491 | A1 * | 3/2004 | Stenestam | 374/29 |
| 2005/0212506 | A1 * | 9/2005 | Khalin et al. | 324/127 |
| 2008/0300807 | A1 * | 12/2008 | Marti et al. | 702/66 |
| 2009/0051374 | A1 * | 2/2009 | Koch | 324/694 |

FOREIGN PATENT DOCUMENTS

EP 1786083 A1 5/2007

OTHER PUBLICATIONS

Linden W. Pierce, "Predicting Liquid Filled Transformer Loading Capability" IEEE Transaction on Industry Applications, vol. 30, No. 1 Jan./Feb. 1994, pp. 170-178.*
International Search Report & Written Opinion of the International Searching Authority; Application No. PCT/EP2009/062731; Issued: Jun. 8, 2010; Mailing Date: Jun. 14, 2010; 8 pages.
Kirtley, et al.; "Monitoring the Health of Power Transformers"; IEEE Computer Applications in Power, IEEE Inc. New York; vol. 9, No. 1; Jan. 1, 1996; pp. 18-23.

* cited by examiner

*Primary Examiner* — Dwin M Craig
(74) *Attorney, Agent, or Firm* — St. Onge Steward Johnston & Reens LLC

(57) ABSTRACT

A calculation model for evaluating the influence of different liquid properties to a thermal performance of a transformer includes at least one liquid parameter and at least one black box parameter whose value is adjusted with help of measurement data from a real transformer. The black box parameter is provided for modelling parts of the transformer which cannot be accessed, typically the active parts of the transformer.

19 Claims, 1 Drawing Sheet

THERMAL MODELLING OF A TRANSFORMER

CROSS-REFERENCE TO RELATED APPLICATIONS

The present application is a continuation of pending International patent application PCT/EP2009/062731 filed on Oct. 1, 2009 which designates the United States and the content of which is incorporated herein by reference.

FIELD OF THE INVENTION

The present invention relates to a method for evaluating the influence of different liquid properties to a thermal performance of a transformer.

BACKGROUND OF THE INVENTION

Liquid cooled transformers are conventionally filled with a mineral oil. Due to environmental benefits and fire safety properties, more easily bio-degradable oils such as natural or synthetic esters and other synthetic liquids are used to substitute the traditional mineral oil. There is an increasing demand for refilling i.e. exchanging the mineral oil of an existing transformer to a less flammable liquid.

The refilling procedure comprises more than simply delivering the new liquid and replacing the old one. The procedure also needs to include the assessment of the transformer and its expected performance after the oil exchange. The thermal behaviour of the transformer will be changed due to different thermal properties and different viscosity of the new liquid. Since the used and aged transformers are initially designed for mineral oil and eventually used with mineral oil, it needs to be assessed whether the transformers still satisfy their operation requirements after the oil exchange.

In cases of old transformers there is often only limited information such as nameplate information, test reports and external dimensions available. The transformers may come from different manufacturers and comprise different technologies and designs. Normally there is no access or a restricted access to the active parts i.e. the core and the windings of the transformer. Consequently, the use of conventional design tools may not help to estimate the thermal performance of these transformers.

EP1786083 discloses a method for monitoring power transformers. Failures are detected in a transformer by comparing measured values obtained from a thermal model.

SUMMARY OF THE INVENTION

One object of the invention is to provide a method for evaluating in advance a thermal behaviour of a transformer after refilling.

A further object of the invention is to provide a calculation model for evaluating in advance a thermal behaviour of a transformer after refilling.

These objects are achieved by the methods and the calculation model according to the present teachings.

The invention is based on the realization that by using black box modules for modelling the parts of the transformer that cannot be accessed, and by using measurement data for adjusting the black box modules, a usable modelling method for a thermal behaviour of a transformer is achieved.

According to a first aspect of the invention, there is provided a method for evaluating the influence of different liquid properties to a thermal performance of a transformer, the method comprising the steps of: providing a calculation model of the transformer, the calculation model being configured to return an indicator of the thermal performance of the transformer; and providing the calculation model with at least one reference liquid parameter value. By creating a calculation model which comprises liquid parameters, the influence of the liquid properties can be easily evaluated by changing the liquid parameter values.

According to one embodiment of the invention the at least one liquid parameter is one of the following: viscosity, thermal conductivity, heat capacity and thermal expansion. The liquid may be modelled by any number of suitable parameters, the named parameters being those which have the greatest effect on the thermal behaviour of the transformer.

According to one embodiment of the invention the method comprises the step of providing the calculation model with a value of at least one transformer parameter. In order to achieve a usable calculation model the transformer should be modelled with suitable parameters the values of which are defined to correspond to the real transformer.

According to one embodiment of the invention the at least one transformer parameter is one of the following: mass, tank dimension, external dimension, liquid volume, rated voltage, impedance and electrical losses. The transformer may be modelled by any number of suitable parameters, the named parameters being those which are easily obtainable and have the greatest effect on the thermal behaviour of the transformer.

According to one embodiment of the invention the calculation model comprises at least one black box parameter whose value is unknown, and the method comprises the step of adjusting the value of the black box parameter with help of measurement data from a real transformer. By using black box parameters for modelling the parts of the transformer which cannot be accessed, and by using measurement data for adjusting the black box modules, a usable calculation model for the transformer is achieved without knowing the details of the transformer design.

According to one embodiment of the invention the measurement data is obtained from a test run in a real transformer. If no earlier measurement data is available it can be obtained with help of a particular test run in the real transformer. The test run can be designed particularly for the purpose of adjusting the black box parameters and provides therefore relevant measurement data.

According to one embodiment of the invention the measurement data is obtained from field measurements from a real transformer. By taking advantage of existing field measurements or by carrying out such measurements the black box parameters can be adjusted without any particular test run. This saves the effort needed for carrying out a test run that may be time consuming.

According to one embodiment of the invention the black box parameter is related to an active part of the transformer. Although any part of the transformer may be modelled with a black box model, the active parts of the transformer are usually those which are difficult to access and which have the greatest effect on the thermal behaviour of the transformer.

According to one embodiment of the invention the measurement data is obtained from a real transformer filled with the reference liquid. In order to achieve as accurate calculation model as possible, the measurements should be carried out using the chosen reference liquid whose parameter values are well known.

According to one embodiment of the invention the reference liquid is a mineral oil. In order to avoid additional work and for ensuring the compatibility of the liquid with the transformer, the measurements should preferably be carried out using the existing liquid of the transformer. Conventionally this is a mineral oil but it can be any liquid that is to be replaced.

According to one embodiment of the invention the method comprises the steps of: exerting a real load on the real transformer filled with the reference liquid and measuring the temperature behaviour of the real transformer to thereby obtain measured results; configuring the calculation model to return a calculated temperature behaviour; running a simulation in the calculation model using a numerical load which corresponds to the real load to thereby obtain calculated results; comparing the calculated results with the measured results and adjusting the black box parameters; repeating the last two steps until the calculated and measured results substantially coincide. By comparing the calculated results with the measured ones and adjusting the black box parameter values accordingly, a calculation model generating satisfactory simulation results is probably obtained in few iteration steps. Of course, the number of iteration steps depends on the experience of the person adjusting the parameter values.

According to one embodiment of the invention the method comprises the steps of: providing the calculation model with a value of at least one liquid parameter of a liquid different from the reference liquid; running a simulation in the calculation model using a numerical load to thereby obtain calculated results. The calculation model fulfils its purpose first when it is used for simulating the behaviour of the transformer with the parameters of a new liquid. From these simulation results the altered thermal behaviour of the transformer can be predicted.

According to one embodiment of the invention the calculation model is configured to return a calculated temperature behaviour. The calculation model can be configured to return any indicator of the thermal performance of the transformer, the temperature behaviour being a very concrete and straightforward indicator.

According to a second aspect of the invention, there is provided a calculation model for evaluating the influence of different liquid properties to a thermal performance of a transformer, the calculation model comprising: at least one reference liquid parameter value; and at least one black box parameter whose value is adjusted with help of measurement data from the transformer filled with the reference liquid. By creating a calculation model which comprises black box parameters even the parts of the transformer which cannot be accessed can be modelled.

BRIEF DESCRIPTION OF THE DRAWINGS

The invention will be explained in greater detail with reference to the accompanying drawings, wherein.

DETAILED DESCRIPTION OF THE INVENTION

Figure 1:
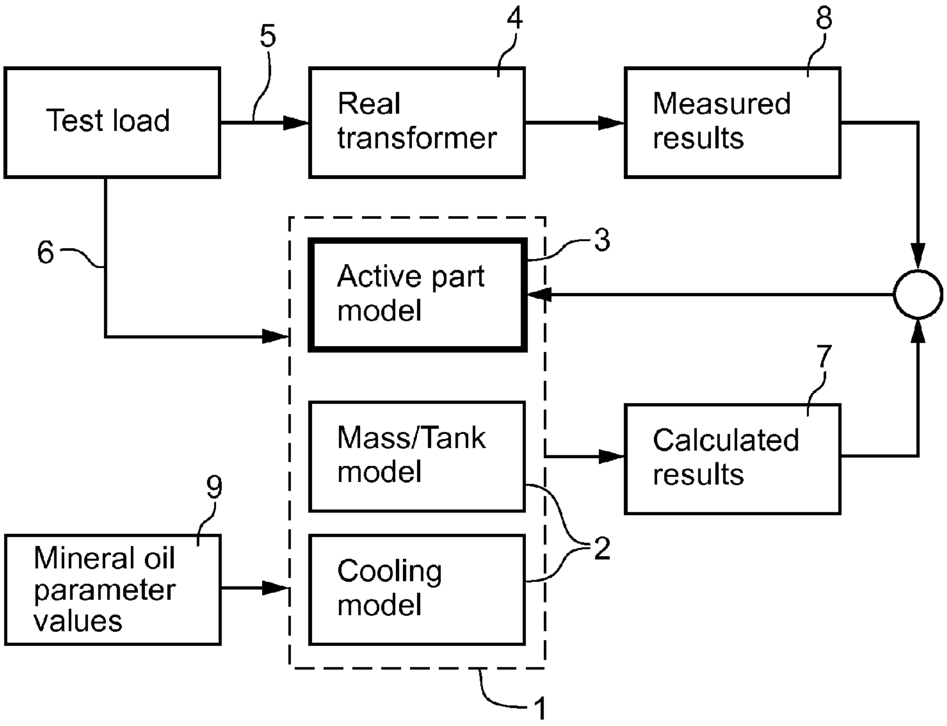
FIG. 1 shows a block diagram illustrating an adjustment procedure of a calculation model.

Referring to FIG. 1 a calculation model 1 according to one embodiment of the invention is divided into different modules 2 which comprise parameters contributing to a thermal performance of a transformer 4. The values of some of the parameters are known while others are not. The parameters whose values are not known are called black box parameters, and the modules comprising these parameters are called black box modules 3. Since the aim of the invention is particularly to evaluate the influence of oil exchange, the calculation model 1 is parameterized by the liquid properties i.e. liquid parameters such as viscosity and thermal conductivity are comprised in different modules 2 of the calculation model 1.

In the case of FIG. 1 the values of mass/tank parameters (liquid volume, tank dimensions, weight, etc.) and the cooling parameters (number and size of radiators, etc.) are known, but the values of the active part parameters (winding geometry, winding type, oil circuit inside, etc.) are not known. The active part is therefore modelled with a black box module 3 which comprises black box parameters. Before the calculation model 1 is usable, the black box module 3 has to be completed by adjusting the black box parameters.

For completing the black box module 3 a test run is conducted with a real transformer 4 filled with a mineral oil. An appropriate real load 5 is exerted on the real transformer 4 and the temperature behaviour of the real transformer 4 is measured. The calculation model 1 is provided with the mineral oil parameter values 9 (viscosity, thermal conductivity, heat capacity, etc.), which are known, and a simulation is run in the calculation model 1 using a numerical load 6 which corresponds to the real load 5. The calculated results 7 are compared with the measured results 8, and the values of the black box parameters are adjusted until the calculated and measured results 7, 8 substantially coincide. After this procedure the calculation model 1 is considered to be complete and it can be used for estimating the thermal performance of the transformer 4.

Figure 2:
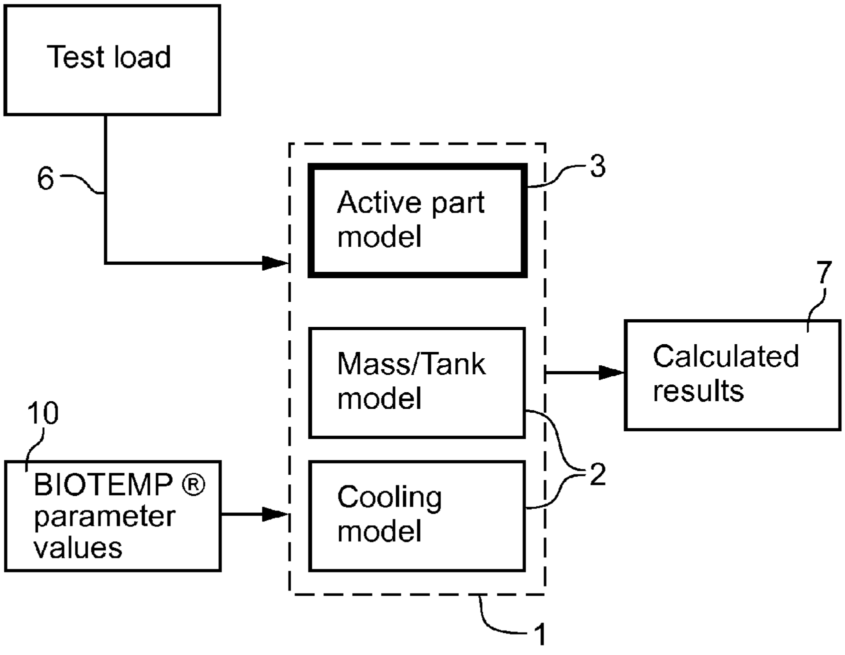
FIG. 2 shows a block diagram illustrating an estimation of the thermal performance of a transformer using a calculation model.

Referring to FIG. 2 the calculation model 1 is used for estimating the thermal performance of the transformer 4 after oil exchange to BIOTEMP®. The calculation model 1 is provided with the BIOTEMP® parameter values 10, and a new simulation is run using the numerical load 6. The calculated results 7 of this simulation are used for establishing how the new liquid, BIOTEMP®, influences the thermal performance of the transformer 4. Typical practical conclusions derived from the simulation results are: a) the expected temperature rises but the transformer 4 maintains its load rating; b) the load rating of the transformer 4 needs to be revised in order to not to exceed the temperature limits; c) cooling capacity needs to be increased in order to maintain the load rating without exceeding the temperature limits.

The invention is not limited to the embodiments shown above, but the person skilled in the art may, of course, modify them in a plurality of ways within the scope of the invention as defined by the claims. Thus, the use of a black box module 3 is not limited to the active parts of the transformer 4 but any part of the transformer 4 can be modelled with a black box module 3.

What is claimed is:

1. A method for evaluating the influence of different liquid properties to a thermal performance of a transformer, the method comprising the steps of:

providing a calculation model of the transformer, the calculation model being configured to return an indicator of the thermal performance of the transformer;

providing the calculation model with at least one reference liquid parameter value;

providing the calculation model with a new liquid parameter value different from the reference liquid parameter value;

providing the calculation model with a numerical load, the numerical load being indicative of a real load on the transformer;

running a simulation by executing the calculation model on a computer process or based at least in part on the reference liquid parameter value, the new liquid parameter value, and the numerical load to thereby obtain calculated results indicative of the thermal performance of the transformer with a liquid corresponding to the new liquid parameter value.

2. The method according to claim 1, wherein the liquid parameter is one of the following: viscosity, thermal conductivity, heat capacity and thermal expansion.

3. The method according to claim 1, wherein the method comprises the step of providing the calculation model with a value of at least one transformer parameter.

4. The method according to claim 3, wherein the at least one transformer parameter is one of the following: mass, tank dimension, external dimension, liquid volume, rated voltage, impedance and electrical losses.

5. The method according to claim 1, wherein the calculation model is further based on at least one black box parameter whose value is unknown, and the method comprises the step of adjusting the value of the black box parameter with help of measurement data from a real transformer.

6. The method according to claim 5, further comprising the step of obtaining the measurement data from a test run in a real transformer.

7. The method according to claim 5, wherein the measurement data is obtained from field measurements from a real transformer.

8. The method according to claim 5, wherein the black box parameter is related to an active part of the transformer.

9. The method according to claim 5, wherein the measurement data is obtained from a real transformer filled with the reference liquid.

10. The method according to claim 9, wherein the reference liquid is a mineral oil.

11. The method according to claim 5, wherein the method comprises the steps of:

exerting a real load on the real transformer filled with the reference liquid and measuring the temperature behaviour of the real transformer to thereby obtain measured results;

configuring the calculation model to return a calculated temperature behaviour;

running a simulation by executing the calculation model on a computer processor using a numerical load which corresponds to the real load to thereby obtain calculated results;

comparing the calculated results with the measured results and adjusting the black box parameters;

repeating the last two steps until the calculated and measured results substantially coincide.

12. The method according to claim 1, wherein the calculation model is configured to return a calculated temperature behaviour.

13. An apparatus for evaluating the influence of a new liquid on a thermal performance of a transformer compared to a reference liquid, comprising:

a computer processor configured to return an indicator of a thermal performance of the transformer;

a data structure comprising a parameter associated with a new liquid;

a data structure comprising a parameter associated with a reference liquid;

wherein the computer processor outputs results indicative of a thermal performance of the transformer using the new liquid based at least in part on the parameter associated with the reference liquid, the parameter associated with the new liquid, and a numerical load indicative of a real load for which the results are associated.

14. The apparatus according to claim 13, wherein the output results indicative of the thermal performance are further based on a black box parameter;

wherein adjustments to the black box parameter based on measurement data from a real transformer affects the results indicative of the thermal performance of the transformer using the new liquid.

15. The apparatus according to claim 14, further comprising:

a data obtaining unit configured to obtain measurement data from a real transformer.

16. The apparatus according to claim 15 wherein the obtaining unit obtains measurement data based on field measurement of the real transformer.

17. The apparatus according to claim 14, wherein the black box parameter is related to an active part of the transformer.

18. The apparatus according to claim 15, wherein the obtaining unit obtains the measurement data from a real transformer filled with the reference liquid.

19. The apparatus according to claim 18, wherein the reference liquid is a mineral oil.

* * * * *